United States Patent Office 3,164,555
Patented Jan. 5, 1965

3,164,555
METHOD FOR PRODUCING HEAT RESISTANT SEMICONDUCTOR MATERIALS FROM NITRILES
Valentin Alexeevich Karguin, ul. Gaydara 7, Apt. 4, and Victor Alexandrovich Kabanov, ul. Petrovka 26, Apt. 330, both of Moscow, U.S.S.R.
No Drawing. Filed Feb. 16, 1961, Ser. No. 90,904
7 Claims. (Cl. 260—2)

The present invention relates to a method for producing heat resistant semiconductor materials.

The present method provides for obtaining heat resistant semiconductor materials using the process of polymerization of fatty and aromatic nitriles, for instance, acetonitrile, benzonitrile and propionitrile.

As catalysts of polymerization serve the coordinationally unsaturated salts of metals of the II, III, IV, V and VIII groups, soluble in the corresponding monomers and forming with the latters the molecular complexes.

*Example 1.*—20 gm of acetonitrile preliminarily distilled and dried under metallic calcium is placed in an autoclave to which 6 gm. of anhydrous $ZnCl_2$ is added. The autoclave is scavenged with dry nitrogen, sealed, heated to the temperature of 200° C. with the same temperature maintained for 8 hours. This results in the formation of a brown-black polymer in powder form which is treated with water to remove $ZnCl_2$. The washed polymer is soluble in concentrated $H_2SO_4$, $H_3PO_4$ and HCOOH. The specific conductance of the dried powder at room temperature is $10^{-6}ohm^{-1}$ and withstands heating to 500° C. without noticeable decomposition.

*Example 2.*—Under the same conditions as in Example 1, the reaction is conducted for 8 hours at the temperature of 250° C. A polymer insoluble in organic and mineral solvents is obtained. After $ZnCl_2$ is washed out the polymer withstands (without noticeable decomposition) heating to a temperature of 500–600° C.; specific conductance of the sample is $10^{-5}ohm^{-1}$.

*Example 3.*—Same as in Example 1, but the reaction is conducted for 10 hours at the temperature of 150° C. A red-brown fusible polymer is obtained, soluble in dimethyl formamide. Specific conductance of the polymer is $10^{-12}ohm^{-1}$. Further heating results in the polymer gradually losing its ability to dissolve (first in dimethyl formamide and then in mineral acids) and its properties becoming similar to those of the polymers described in Examples 1 and 2.

*Example 4.*—10 gm. of $AlCl_3$ is added to 20 gm. of acetonitrile placed in an autoclave in a dry and inert atmosphere. The reaction mixture is heated at 150° C. for 10 hours. The resultant polymer possesses properties similar to those of the polymer in Example 2.

*Example 5.*—10 gm. of $TiCl_4$ is added to 20 gm. of acetonitrile placed in an autoclave in a dry and inert atmosphere and is heated at the temperature of 150° C. for 10 hours. This results in a solid insoluble product having the specific conductance of $10^{-3}ohm^{-1}$ and withstanding heating to the temperature of 600–650° C. without noticeable decomposition.

*Example 6.*—9 gm. of anhydrous $SbCl_3$ is added to 20 gm. of acetonitrile placed in an autoclave in a dry and inert atmosphere. This is heated for 15 hours at a temperature of 180–185° C. The obtained polymer is washed with concentrated hydrochloric acid until a negative reaction to the ion of antimony occurs, then washed with water and dried. The specific conductance of the polymer is $10^{-6}ohm^{-1}$ and its properties are similar to those of the polymer described in Example 2.

*Example 7.*—6 gm of anhydrous $FeCl_2$ is added to 20 gm. of acetonitrile. Reaction conditions are similar to those described in Example 2. The resulting polymer withstands heating to the temperature of 600° C. Specific conductance is $10^{-4}ohm^{-1}$.

*Example 8.*—1.5 gm. of $ZnCl_2$ is added to 5 gm. of benzonitrile. The reaction goes for 10 hours in an autoclave at the temperature of 160° C. The conductance of the obtained polymer is $10^{-5}ohm^{-1}$ and it withstands heating to the temperature of 700° C.

*Example 9.*—1.5 gm. of $ZnCl_2$ is added to 5 gm. of propionitrile. The reaction is conducted for 18 hours in an autoclave at the temperature of 230° C. The conductance of the obtained polymer is $10^{-7}ohm^{-1}$ and withstands heating to the temperature of 500° C.

What we claim is:
1. A method for producing heat resistant semi-conductor polymers comprising heating acetonitrile in an inert atmosphere in the presence of a catalyst soluble in said nitrile and selected from the group consisting of chlorides of the metals of group II, III, IV, V and VIII of the periodic system to a temperature between 150° C. and 300° C. for between 8 and 18 hours, the temperature and duration of said heating being sufficient to yield a solid polymer as a result of said heating.
2. The product produced by the process of claim 1.
3. The process of claim 1 wherein the catalyst is zinc chloride.
4. The process of claim 1 wherein the catalyst is antimony chloride.
5. The process of claim 1 wherein the catalyst is aluminum chloride.
6. The process of claim 1 wherein the catalyst is titanium chloride.
7. The process of claim 1 wherein the catalyst is ferric chloride.

References Cited in the file of this patent
UNITED STATES PATENTS

| | | |
|---|---|---|
| 2,125,851 | Ralston | Aug. 2, 1938 |
| 2,175,092 | Ralston | Oct. 3, 1939 |